Figure 1:
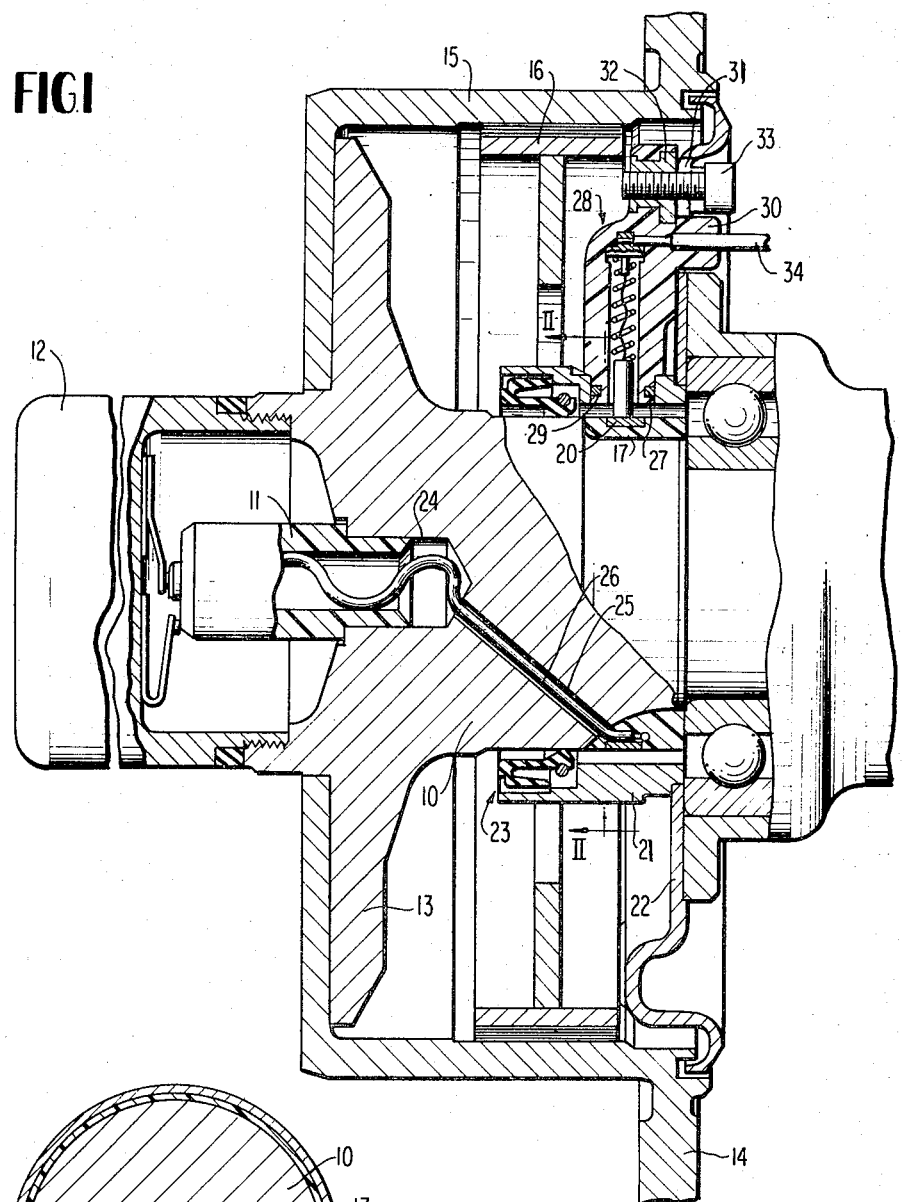

United States Patent [19]
Wörner et al.

[11] 3,719,916
[45] March 6, 1973

[54] SLIP-RING ARRANGEMENT ESPECIALLY FOR BRAKE SLIPPAGE CONTROL INSTALLATIONS OF MOTOR VEHICLES

[75] Inventors: Otto Wörner, Reutlingen; Franz Brugger; Erwin Weller, both of Stuttgart, all of Germany

[73] Assignee: Daimler Beng Aktiengesellschaft, Stuttgart-Unterukheim, Germany

[22] Filed: Sept. 3, 1971

[21] Appl. No.: 177,649

[30] Foreign Application Priority Data

Sept. 4, 1970  Germany.....................P 20 43 841.9

[52] U.S. Cl........................339/3 R, 73/129, 340/58
[51] Int. Cl. ..............................................H01r 39/00
[58] Field of Search .....................73/129; 339/3, 5, 8

[56] References Cited

UNITED STATES PATENTS 2,636,090  4/1953  Branechofsky........................73/129
3,162,835  12/1964  Dudar..............................339/3 R X
2,523,594  9/1950  Sagaser et al.......................340/58 X Primary Examiner—Richard E. Moore
Attorney—Craig, Antonelli & Hill

[57] ABSTRACT

A slip-ring arrangement, intended especially for brake force control systems in motor vehicles, for the transmission of electrical signals from a rotating part to a stationary part whereby a signal transmitter is arranged at the rotating part and is connected by way of a line with a slip-ring disposed on the wheel hub on the inside of the brake; one of several stationary brushes slide on the slip-ring whereby the slip-ring itself is arranged on the wheel hub exclusively on the inside of a sealed-off space and is connected with the signal transmitter by way of a cable on the inside of the wheel hub while the brush or brushes are secured at the brake carrier with the aid of a one-piece plastic part which simultaneously contains means for guiding the cable.

19 Claims, 2 Drawing Figures

PATENTED MAR 6 1973

3,719,916

INVENTORS
OTTO WÖRNER
FRANZ BRUGGER
ERWIN WELLER

BY Craig, Antonelli & Hill
ATTORNEYS

SLIP-RING ARRANGEMENT ESPECIALLY FOR BRAKE SLIPPAGE CONTROL INSTALLATIONS OF MOTOR VEHICLES

The present invention relates to a slip-ring arrangement, especially for brake force control systems in motor vehicles for the transmission of electric signals from a rotating part to a stationary part, whereby a signal transmitter is arranged preferably centrally at the rotating part and is connected by way of a line with a slip-ring disposed on the wheel hub within a brake, on which run one or several stationary, elastically readjustable brushes preferably arranged at the brake carrier.

With such types of slip-ring arrangements considerable problems exist as regards the seal by reason of the soiling customary at the vehicle wheel. One has attempted theretofore to solve these problems in that a separate slip-ring support is mounted over an axle stub, to which a cable is led about the outside from the central signal transmitter. The brushes slide on the slip-ring which are inserted in a sealing ring mounting. A cable again leads from the brushes to a separate passage in the brake carrier. This prior art arrangement is disadvantageous because, first of all, it does not produce a good seal and, secondly, it is complicated in construction and difficult in the assembly. Additionally, the externally extending cable is subjected to the influence of the centrifugal force so that under certain circumstances there is a tendency to abrasion at the places where it passes through stationary parts. The connecting places of this cable are also unfavorably stressed by the centrifugal force.

The present invention is concerned with the task to avoid the aforementioned disadvantages. Consequently, a slip-ring arrangement is to be provided which produces an absolutely safe seal during continuous operation over long periods of time, and which in the construction, the manufacture and the assembly is simple and inexpensive. The underlying problems are solved by the present invention with the arrangements of the type described above in that the slip-ring is arranged on the wheel hub exclusively on the inside of the sealed-off space and that it is operatively connected on the inside of the wheel hub by way of a cable with a contact-maker arranged in a central dead-end bore of the wheel hub, and in that the brush or brushes are secured at the brake carrier with the aid of a unitary, one-piece plastic part whereby this plastic part simultaneously contains the cable guidance.

The construction according to the present invention offers the advantage that an absolute sealing tightness is achieved by the central cable guidance and the arrangement of the slip-ring. Additionally, the centrifugal force on the cable is reduced. The brush mounting is considerably simplified so that—as seen from an overall point of view—the slip-ring arrangement according to the present invention can be manufactured very easily and can be assembled very easily.

In a preferred embodiment of the present invention a support ring of any suitable plastic material is laterally mounted over the wheel hub, which is provided with at least one radially inwardly directed cam acting as locking means against rotation whereby the metallic slip-ring is embedded in this support ring. The support ring may thereby also be molded or cast over the wheel hub, pressed over the wheel hub or mounted over the same in any other suitable manner. Similar considerations also apply for the embedding of the slip-ring itself into the support ring.

It is additionally proposed by the present invention that an inclined bore extends from a recess at the wheel hub circumference corresponding to the cam of the support ring toward the central dead-end bore for the accommodation of the transmission cable in the wheel hub interior. Naturally the connection of the cable to the slip-ring may also take place at any other appropriate place, i.e., for example, also outside of the aforementioned cam. It is particularly appropriate if the cable is thereby embedded in the support ring and is connected inside of the support ring with the slip-ring or slip-rings.

A further feature of the present invention resides in that the support ring together with the slip-ring is disposed sealed off on the inside of a sleeve-shaped sealing-ring mounting, which is secured at one end in the brake carrier and at the other end carries a seal. This seal then is appropriately disposed directly on the wheel hub.

A further proposal of the present invention resides in that the plastic part receiving the brush is sealingly inserted into an opening of the sealing-ring mounting. The seal can thereby take place by means of an O-ring or in a similar manner. According to the present invention the plastic part receiving the brush engages with a lateral extension in an aperture at the brake carrier plate whereby the continuing cable is sealingly inserted into this extension. Also in that case the insertion or installation can take place by molding or casting about the cable. Provision is furthermore made that the opening at the brake carrier plate is constructed approximately as radially disposed elongated aperture through which the lateral extension of the plastic part projects and that the plastic part is secured in this elongated aperture by means of a threaded connection. A metal insert is provided according to the present invention in the plastic part for this threaded connection. This metal insert may also include the cable sheath for purposes of tensional relief of the cable.

Accordingly, it is an object of the present invention to provide a slip-ring arrangement, especially for brake force control systems in motor vehicles, which avoids by simple means the aforementioned shortcomings and drawbacks encountered in the prior art.

Another object of the present invention resides in a slip-ring arrangement, intended in particular for brake force control installations in motor vehicles which solves the problems as regards sealing and soiling in a most satisfactory manner.

A further object of the present invention resides in a slip-ring arrangement of the aforementioned type which not only produces a good seal but is simple in construction and easy to install.

Still another object of the present invention resides in a slip-ring arrangement, especially for brake force control installations in motor vehicles, which minimizes the influence of the centrifugal force on the cable transmitting a signal from a rotating to a non-rotating part.

Still a further object of the present invention resides in a slip-ring arrangement for brake force control systems in motor vehicles which exhibits an extraordinarily long length of life combined with absolute sealing tightness.

Figure 2:
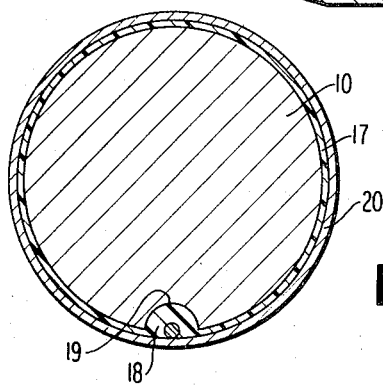

These and other objects, features and advantages of the present invention will become more apparent from the following description when taken in connection with the accompanying drawing which shows, for purposes of illustration only, one embodiment in accordance with the present invention, and wherein FIG. 1 is a partial axial cross-sectional view through a slip-ring arrangement in accordance with the present invention, and FIG. 2 is a cross-sectional view through the support ring and slip-ring, taken along line II—II in FIG. 1.

Referring now to the drawing wherein like reference numerals are used throughout the two views to designate like parts, a conventional contact-maker 11 is arranged according to FIGS. 1 and 2 in the wheel hub 10 centrally thereof, which transmits the signals of a pulse transmitter 12 of conventional construction and therefore not illustrated in detail. The wheel hub 10 carries in an otherwise known manner by means of a flange 13 the brake disc 14, not illustrated in detail, in the drum-like part 15 of which is arranged the hand brake 16. A support ring 17 is laterally mounted directly on the wheel hub 10, which engages at one place (FIG. 2) by means of a cam 18 in a corresponding recess 19 at the wheel hub 10. The support ring 17, therefore, cannot rotate relative to the wheel hub 10. A slip-ring 20 is embedded in the support ring 17. The support ring 17 is disposed on the inside of a sleeve-shaped sealing ring mounting 21 which at one end is secured in the brake carrier 22 and at the other end carries a sealing ring generally designated by reference numeral 23 of any conventional construction which abuts with its sealing lip directly at the wheel hub 10. The slip-ring 20 is therefore disposed on the inside of the sealed-off space.

An inclined bore 25 leads on the inside of the wheel hub 10 from a central dead-end bore 25 in the wheel hub 10—in which is inserted the contact-maker 11—up to the recess 19. A cable leads through this inclined bore 25 from the contact-maker 11 to the slip-ring 20. The cable end is soldered to the slip-ring 20 in a customary manner. In this manner the cable inclusive its connecting places is arranged over its entire length on the inside of the sealed off space.

An aperture 27 is provided in the sealing-ring mounting 21, into which a plastic part generally designated by reference numeral 28 and serving as brush support is sealingly inserted by means of an O-ring 29. A conventional springy brush re-adjusting mechanism of known construction and therefore not illustrated in detail is arranged on the inside of this plastic part 28. The plastic part 28 includes a lateral extension 30 by means of which it engages in an elongated aperture 31 at the brake carrier 22. A radial extension at the plastic part 28 includes a metallic threaded brush 32. The plastic part 28 is secured in the elongated aperture 31 with the aid of the screw 33 and this threaded bush 32.

The further cable 34 is inserted into the lateral extension 30 of the plastic part 28 and is connected thereat with the brush arrangement. Also this connection is thereby sealed off absolutely. In order to achieve a tensional load relief, it is also possible to insert the outer sheath of the cable 34 into the threaded bush 32 and, for example, to securely clamp the same thereat.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A slip-ring arrangement for transmitting electrical signals from a rotating to a stationary part, in which a signal transmitter means is arranged at the rotating part and is operatively connected by way of a cable with a slip-ring means disposed on a wheel hub on the inside of a brake means, and in which at least one brush means slides on the slip-ring means, characterized in that the slip-ring means is arranged on the wheel hub exclusively inside of a sealed-off space means, in that the slip-ring means is operatively connected on the inside of the wheel hub by way of a cable with a contact means arranged in a substantially central dead-end bore of the wheel hub, and in that the brush means is secured at a part of the brake means with the aid of a plastic part, said plastic part simultaneously containing cable guide means.

2. A slip-ring arrangement according to claim 1, characterized in that the signal transmitter means is arranged substantially centrally.

3. A slip-ring arrangement according to claim 1, characterized in that each brush means is resiliently adjustable.

4. A slip-ring arrangement according to claim 1, characterized in that the plastic part is a unitary, one-piece element.

5. A slip-ring arrangement according to claim 1, characterized in that the part of the brake means at which the brush means is arranged is a brake carrier.

6. A slip-ring arrangement according to claim 1, characterized in that several brush means slide on the slip-ring means.

7. A slip-ring arrangement according to claim 1, characterized in that the slip-ring arrangement is used with a brake force control system of motor vehicles.

8. A slip-ring arrangement according to claim 1, characterized in that a support ring means of plastic material is laterally mounted over the wheel hub, which includes at least one radially inwardly directed cam means operable as rotation-preventing means, and in that the metallic slip-ring means is embedded in this support ring means.

9. A slip-ring arrangement according to claim 8, characterized in that an inclined bore for the accommodation of the cable in the wheel hub interior extends from a recess at the wheel hub circumference, corresponding to the cam of the support ring means, toward the substantially central dead-end bore.

10. A slip-ring arrangement according to claim 9, characterized in that the cable is embedded in the support ring means and is operatively connected on the inside of the support ring means with the slip-ring means.

11. A slip-ring arrangement according to claim 10, characterized in that the support ring means is disposed together with the slip-ring means on the inside of a sleeve-shaped sealing ring mounting means which is secured at one end at the part of the brake means and which carries at the other end a seal means.

12. A slip-ring arrangement according to claim 11, characterized in that the plastic part receiving the brush means is inserted into an aperture of the sealing-ring mounting means.

13. A slip-ring arrangement according to claim 12, characterized in that the plastic part receiving the brush means engages with a lateral extension thereof into an aperture at a brake carrier plate and in that a further cable is sealingly inserted into said extension.

14. A slip-ring arrangement according to claim 13, characterized in that the aperture at the brake carrier plate is constructed as approximately radially disposed elongated aperture and the plastic part is secured in said elongated aperture by a threaded connecting means.

15. A slip-ring arrangement according to claim 8, characterized in that the cable is embedded in the support ring means and is operatively connected on the inside of the support ring means with the slip-ring means.

16. A slip-ring arrangement according to claim 8, characterized in that the support ring means is disposed together with the slip-ring means on the inside of a sleeve-shaped sealing ring mounting means which is secured at one end at the part of the brake means and which carries at the other end a seal means.

17. A slip-ring arrangement according to claim 16, characterized in that the plastic part receiving the brush means is inserted into an aperture of the sealing-ring mounting means.

18. A slip-ring arrangement according to claim 16, characterized in that the plastic part receiving the brush means engages with a lateral extension thereof into an aperture at a brake carrier plate and in that a further cable is sealingly inserted into said extension.

19. A slip-ring arrangement according to claim 18, characterized in that the aperture at the brake carrier plate is constructed as approximately radially disposed elongated aperture and the plastic part is secured in said elongated aperture by a threaded connecting means.

* * * * *